C. BARNETT.
MEANS FOR SUSPENDING NETS VERTICALLY IN THE WATER.
APPLICATION FILED FEB. 6, 1919.
1,320,033.
Patented Oct. 28, 1919.
2 SHEETS—SHEET 1.
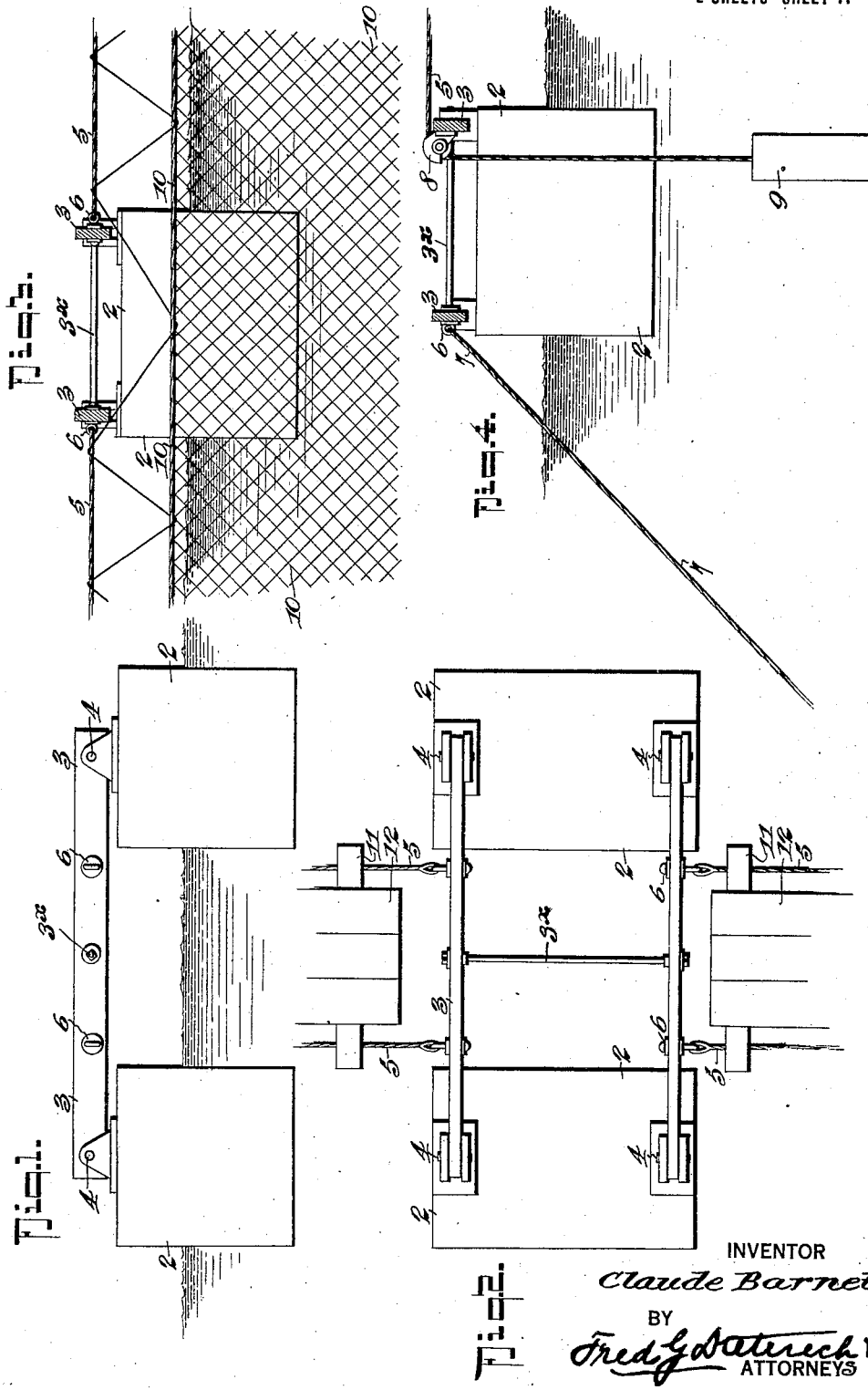
INVENTOR
Claude Barnett.
BY
Fred G. Dieterich
ATTORNEYS

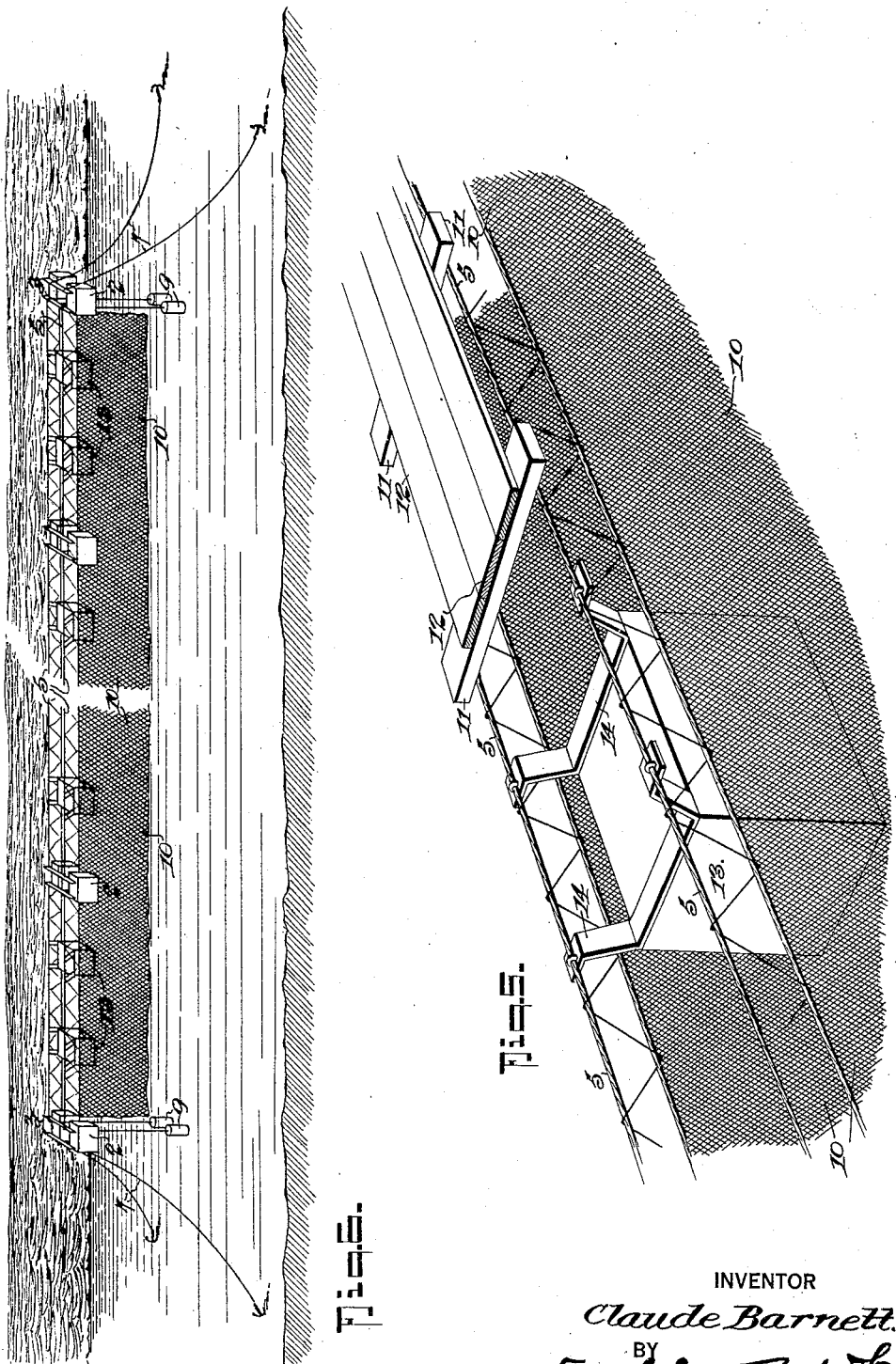

UNITED STATES PATENT OFFICE.

CLAUDE BARNETT, OF KETCHIKAN, TERRITORY OF ALASKA.

MEANS FOR SUSPENDING NETS VERTICALLY IN THE WATER.

1,320,033.      Specification of Letters Patent.      Patented Oct. 28, 1919.

Application filed February 6, 1919. Serial No. 275,412.

*To all whom it may concern:*

Be it known that I, CLAUDE BARNETT, a citizen of the United States, residing at Ketchikan, in the Territory of Alaska, U. S. A., have invented certain new and useful Improvements in Means for Suspending Nets Vertically in the Water, of which the following is a specification.

This invention relates to a means for suspending a line of nets vertically in the water, such as may form a part of a fish trap or direct the run of fish thereto.

Such nets are commonly supported, where the nature of the bottom allows on a line of piles driven into the bottom, but suitable bottom is not always available, and where this is the case the nets are suspended from floatable logs connected by chains.

These logs form an obstruction against which floating logs carried down to the sea by spring freshets collect, and are liable, in even a moderate sea, to break the line or drag its anchorage.

I therefore suspend the line of net below water from a line of substantial wire rope supported above water from floatable pontoons with intermediate pontoons at intervals as required.

The end pontoons of this line are anchored in any suitable manner to the bottom and to prevent slacking of the over-water line during fall of the tide, one or both ends of it pass over sheaves and carry a vertically suspended weight.

As a supplementary feature, two over-water parallel lines may be carried by the pontoons, across which a footway may be carried affording access for inspection of the line by the attendant.

The invention is particularly described in the following specification, reference being made to the drawings by which it is accompanied, in which:

Figure 1 illustrates an end view of a pair of pontoons forming one unit of support.

Fig. 2 is a plan of the same, and

Fig. 3 is a detail longitudinal section that also illustrates a portion of the suspended net.

Fig. 4 shows a longitudinal section of one of the end pair of pontoons showing the connection of the same to the anchorage and the provision for maintaining the lines tight.

Fig. 5 shows an intermediate supporting pontoon, and

Fig. 6, a view to a reduced scale showing a line of nets supported by my approved means.

In these drawings 2 represents a pontoon or floatable body of suitable size. These pontoons are connected together in pairs as shown in Figs. 1, 2 and 3, by transverse members 3 pivotally connected at 4 to the end of each pontoon on the medial line. Between each pair of pontoons net supporting lines 5 are connected at 6 to the transverse members 3, the connection 6 being such as will form a swivel to provide for the twist of the rope, or a swivel as such may be introduced in the connection.

Each end pair of pontoons is connected by a line 7 to a bottom anchorage, and the net supporting line 5 passes at each end around a sheave 8 mounted on the inner transverse member 3 between the end pair of pontoons, and a weight 9 is vertically suspended from the end of the line. This weight or weights will maintain a substantially constant tension on the line 5 during rise and fall of the tide and maintain that line clear of the water. From the line 5 the net 10 is vertically suspended, the lower edge of the net being weighted to maintain it upright against tidal flow, or other means may be provided for this purpose.

Where it is considered desirable to provide a footway along the line for inspection of it, cross ties 11 may be secured across the two ropes on which boards 12 may be laid, as indicated in Fig. 5. Adjacent ones of each pair of cross bars 3 may be tied together by suitable ropes 3ˣ, if desired, as shown in Figs. 1, 2, 3 and 4.

Intermediate of the connected pairs of pontoons 2, the line or lines 5 may be sustained clear of the water by pontoons 13, to which the lines 5 are connected by brackets 14 to support them at the required height.

The essential feature of the invention lies in the use of floatable bodies connected at wide intervals apart by wire ropes whether above or below the surface of the water and the suspension of the net from the wire ropes which connect the floatable bodies, in distinction to the present practice where floatable bodies, such as logs, are continuously connected end to end and the net is connected to the floatable bodies.

Having now particularly described my invention, I hereby declare that what I claim as new and desire to be protected in by Letters Patent, is:

1. A means for suspending a line of nets vertically in the water, said means comprising a series of floatable bodies of sufficient buoyancy to sustain the net and being connected together at wide intervals apart by a wire rope, and means for suspending the nets from the wire ropes and means for anchoring the floating end bodies, and means for taking up slack in the wire rope connecting the bodies due to rise and fall of the tide.

2. A means for suspending a line of nets vertically in the water, said means comprising a series of floatable bodies connected in pairs by a rigid cross bar extending between each pair and pivotally connected to each, a wire rope extending between the cross bars of adjacent pairs, means for anchoring each end pair of floatable bodies, and means for suspending the nets from the wire rope.

3. A means for suspending a line of nets vertically in the water, said means comprising a series of pontoons connected in pairs by a cross bar extending between and pivotally connected to each, each pair of pontoons connected to the adjacent pairs by steel wire ropes, means for anchoring the end pair of pontoons, means for taking up the slack of the wire rope under the rise and fall of the tide, and means for suspending the net from the wire rope.

4. Means for suspending a line of nets vertically in the water, said means comprising a series of pontoons connected in pairs by a rigid cross bar pivotally connected at each end, each pair of pontoons connected to the adjacent pair by parallel steel wire ropes, means for anchoring the end pair of pontoons, and means for supporting the wire rope intermediate of the pairs by pontoons connected to the wire rope.

5. A means for suspending a line of nets vertically in the water, said means comprising a series of pontoons connected in pairs by a rigid cross bar pivotally connected at each end, each pair of pontoons connected to the adjacent pairs by parallel steel wire ropes, means for anchoring the end pair of pontoons, and means for taking up the slack of the wire ropes where connected to the end pontoons by means of a sheave mounted on one of the transverse connecting bars, and a weight connected to the end of each rope where it passes over its sheave, means for suspending a net from one of the lines of wire rope, and cross ties secured across the parallel wire ropes providing a footway.

In testimony whereof I affix my signature.

CLAUDE BARNETT.

Copies of this patent may be obtained for five cents each, by addressing the "Commissioner of Patents, Washington, D. C."